(12) United States Patent
Tai

(10) Patent No.: US 10,049,261 B2
(45) Date of Patent: Aug. 14, 2018

(54) METHOD FOR IDENTIFYING AGE BASED ON FACIAL FEATURE

(71) Applicant: CLOUD NETWORK TECHNOLOGY SINGAPORE PTE. LTD., Singapore (SG)

(72) Inventor: Ling-Chieh Tai, New Taipei (TW)

(73) Assignee: Cloud Network Technology Singapore Pte. Ltd., Singapore (SG)

(*) Notice: Subject to any disclaimer, the term of this patent is extended or adjusted under 35 U.S.C. 154(b) by 99 days.

(21) Appl. No.: 15/149,172

(22) Filed: May 8, 2016

(65) Prior Publication Data

US 2017/0286753 A1    Oct. 5, 2017

(30) Foreign Application Priority Data

Apr. 1, 2016  (TW) .............................. 105110456 A

(51) Int. Cl.
*G06K 9/46*    (2006.01)
*G06K 9/00*    (2006.01)

(52) U.S. Cl.
CPC ..... *G06K 9/00281* (2013.01); *G06K 9/00248* (2013.01); *G06K 9/00288* (2013.01); *G06K 9/46* (2013.01); *G06K 2009/00322* (2013.01)

(58) Field of Classification Search
None
See application file for complete search history.

(56) References Cited

U.S. PATENT DOCUMENTS

| | | | | |
|---|---|---|---|---|
| 8,212,894 | B2* | 7/2012 | Nozaki | H04N 5/232 348/222.1 |
| 8,989,453 | B2* | 3/2015 | Steinberg | H04N 5/23212 382/118 |
| 2012/0308090 | A1* | 12/2012 | Sukegawa | G06K 9/00288 382/118 |
| 2012/0308124 | A1* | 12/2012 | Belhumeur | G06K 9/00281 382/159 |
| 2016/0063314 | A1* | 3/2016 | Samet | G06K 9/00288 348/78 |
| 2017/0277938 | A1* | 9/2017 | Uimonen | G06K 9/00261 |
| 2017/0286753 | A1* | 10/2017 | Tai | G06K 9/00281 |

* cited by examiner

*Primary Examiner* — Iman K Kholdebarin
(74) *Attorney, Agent, or Firm* — ScienBiziP, P.C.

(57) ABSTRACT

A method for identify age based on facial features, includes: getting a face image and capturing a face area from the face image; setting a plurality of facial feature points on the face area; defining a plurality of age feature areas on the face area based on coordinates of the plurality of feature points; acquiring age feature from the plurality of age feature area to get an age value; and comparing the age value with at least one threshold value.

15 Claims, 8 Drawing Sheets

METHOD FOR IDENTIFYING AGE BASED ON FACIAL FEATURE

CROSS-REFERENCE TO RELATED APPLICATIONS

This application claims priority to Taiwanese Patent Application No. 105110456, filed on Apr. 1, 2016, the contents of which are incorporated by reference herein.

FIELD

The subject matter herein relates to a method for identifying age based on facial feature.

BACKGROUND

With the development of facial identification technology, user demands for identification of facial attributes continue to increase, such as facial age identification. For example, facial age identification helps to collect information of users of different age groups for analysis of popularity of certain products among different age groups.

BRIEF DESCRIPTION OF THE DRAWINGS

Implementations of the present technology will now be described, by way of example only, with reference to the attached figures.

DETAILED DESCRIPTION

Figure 1:
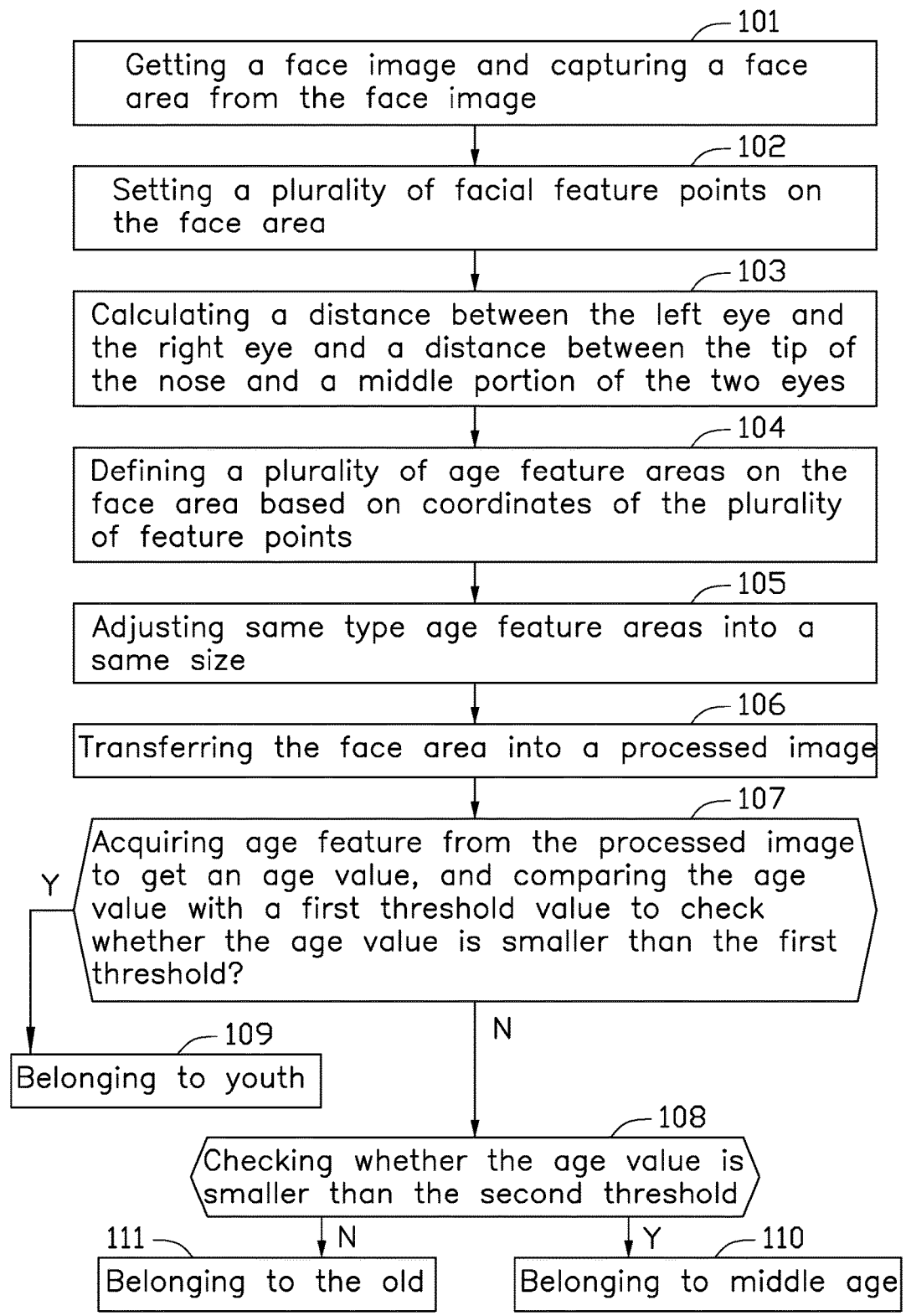
FIG. 1 is a flow chart of a method for identifying age based on facial feature.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series and the like.

FIG. 1 illustrates a flow chart of a method for identifying age based on facial feature. The method includes following steps.

At block 101, the method includes getting a face image and capturing a face area from the face image.

Figure 2:
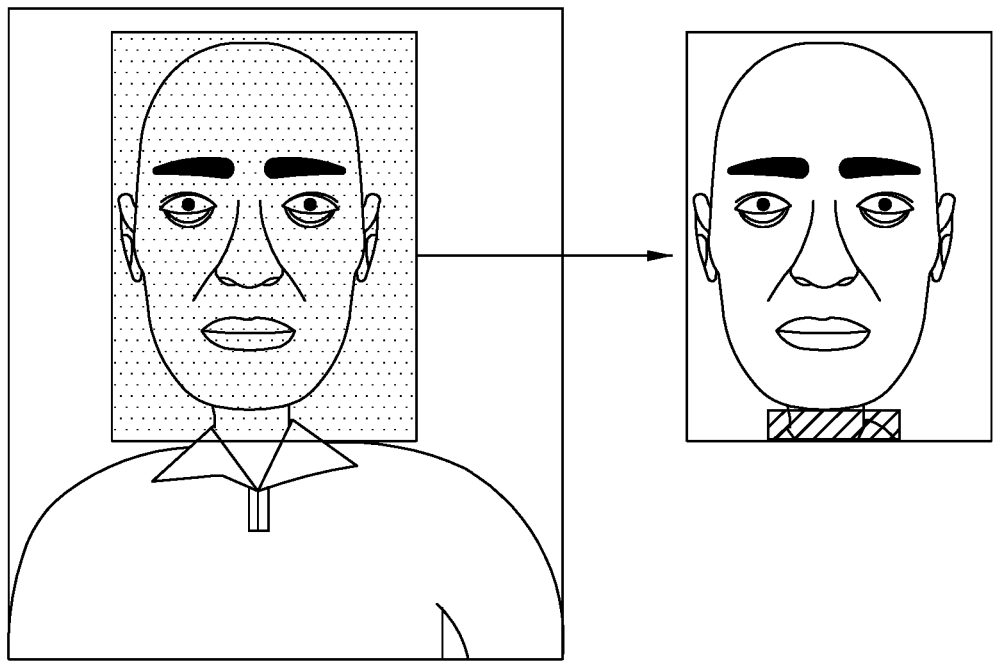
FIG. 2 is diagrammatic view of capturing a face area from a face image.

FIG. 2 illustrates a face image and a face area. Usually, the face image not only shows the face, but also shows other portions of the body, such as body. The face area is captured from the face image to only include the face.

At block 102, the method includes setting a plurality of facial feature points on the face area.

Figure 3:
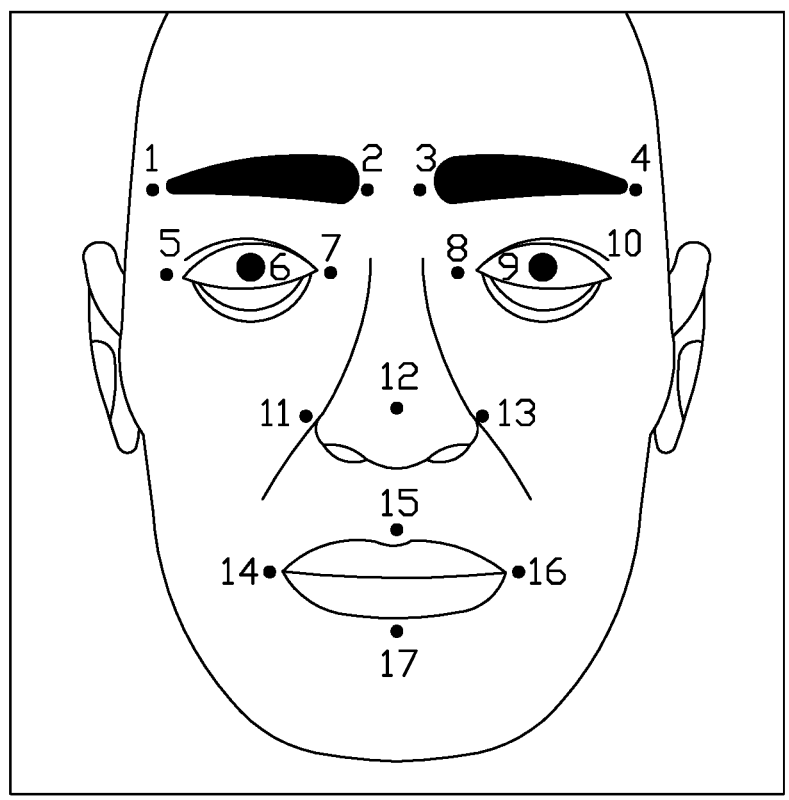
FIG. 3 is diagrammatic view of setting a plurality of facial feature points on the face area.

FIG. 3 illustrates that there are seventeen feature points set on the face area to mark eyebrow, eye, nose, and mouth. Fourth example, a feature point 1 marks a left eyebrow tail. A feature point 2 marks a left eyebrow head. A feature point 3 marks a right eyebrow head. A feature point 4 marks a right eyebrow tail. A feature point 5 marks an outer canthus of a left eye. A feature point 6 marks a middle portion of the left eye. A feature point 7 marks an inner canthrus of the left eye. A feature point 8 marks an inner canthrus of a right eye. A feature point 9 mark a middle portion of the right eye. A feature point 10 marks an outer canthurs of the right eye. A feature point 11 marks a left nosewing. A feature point 12 marks a tip of the nose. A feature point 13 marks a right nosewing. A feature point 14 marks a left corner of the mouth. A feature point 15 marks a middle portion of a upper lip of the mouth. A feature point 16 marks a right corner of the mouth. A feature point 17 marks a middle portion of a lower lip of the mouth.

In other embodiment, more or less feature points can be used to mark the face area, or other apparatus, such as ears, can be marked by the feature points.

At block 103, the method includes calculating a distance W between the left eye and the right eye and a distance H between the tip of the nose and a middle portion of the two eyes.

Figure 4:
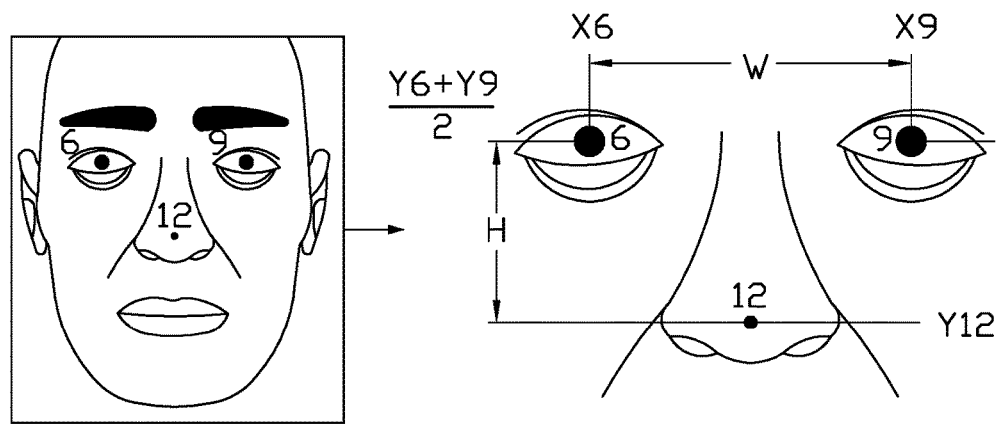
FIG. 4 is a diagrammatic view to show a distance W between the left eye and the right eye and a distance H between the tip of the nose and a middle portion of the two eyes.

FIG. 4 illustrates that the face area and the feature points 1-17 are located in a rectangular coordinate system which includes a horizontal axis X and a vertical axis Y. Therefore, each of the feature points 1-17 has corresponding coordinate. For examples, the feature point 1 has a coordinate (X1, Y1), the feature point 2 has a coordinate (X2, Y2), and so on. For calculating the distances W and H, the coordinates of the feature points 6, 9, and 12 are used. The feature point 6 has a coordinate (X6, Y6), the feature point 7 has a coordinate (X7, Y7), and the feature point 9 has a coordinate (X9, Y9). The distance W between the left eye and the right eye is equal to X9-X6, and the distance H between the tip of the nose and a middle portion of the two eyes is equal to Y12-(Y6+Y9)/2.

At block 104, the method includes defining a plurality of age feature areas on the face area based on the distances W and H and coordinates of the feature points 1-17.

Figure 5:
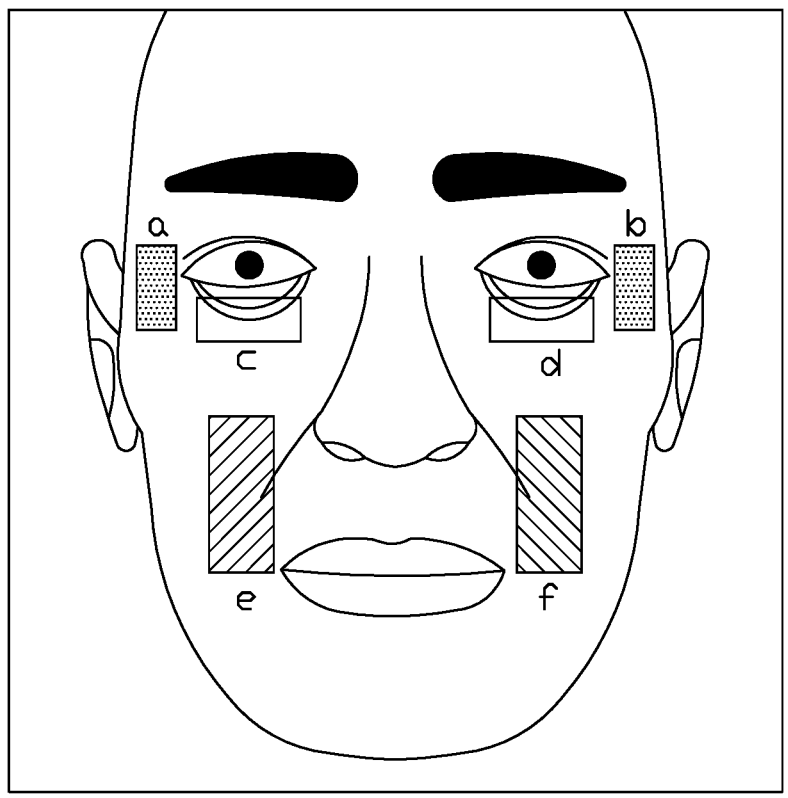
FIG. 5 is a diagrammatic view to show a plurality of age feature areas.

FIG. 5 illustrates that the plurality of age feature areas includes a left and a right eye tail areas a and b, a left and a right eye nether areas c and d, and a left and a right smile folds areas e and f.

Figure 6:
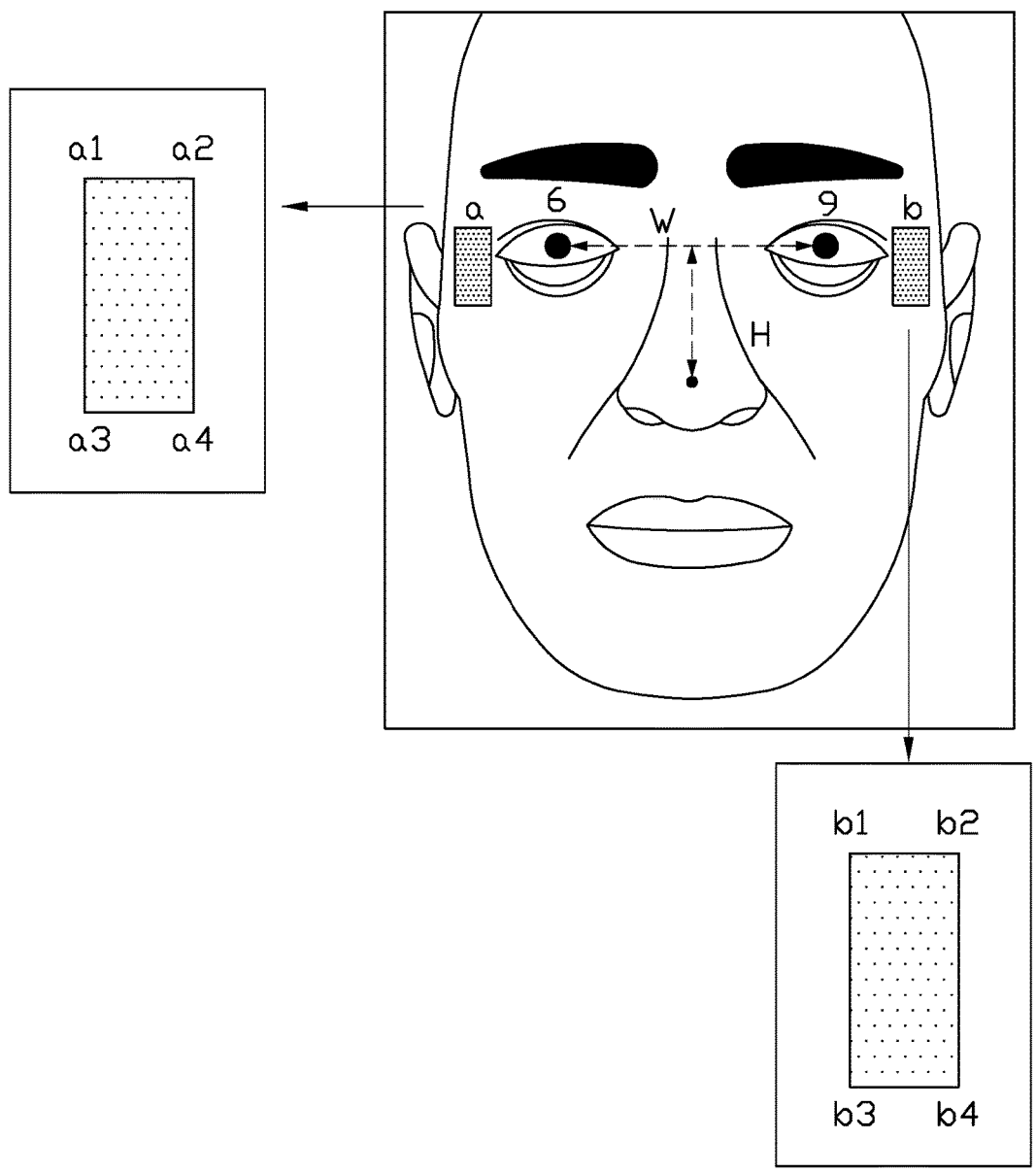
FIG. 6 is a diagrammatic view to show sizes and positions of two eye tail areas.

FIG. 6 illustrates that the left eye tail area a includes four corners a1, a2, a3, a4 and the right eye tail area b includes four corners b1, b2, b3, b4. The positions of the corners are defined in below block.

| corner | X | Y |
|---|---|---|
| a1 | X = X6 − W*0.6 | Y = (Y6 + Y9)/2 |
| a2 | X = X6 − W*0.4 | Y = (Y6 + Y9)/2 |
| a3 | X = X6 − W*0.6 | Y = (Y6 + Y9) + H*0.8 |
| a4 | X = X6 − W*0.4 | Y = (Y6 + Y9) + H*0.8 |
| b1 | X = X9 + W*0.4 | Y = (Y6 + Y9)/2 |
| b2 | X = X9 + W*0.6 | Y = (Y6 + Y9)/2 |
| b3 | X = X9 + W*0.4 | Y = (Y6 + Y9) + H*0.8 |
| b4 | X = X9 + W*0.6 | Y = (Y6 + Y9) + H*0.8 |

Figure 7:
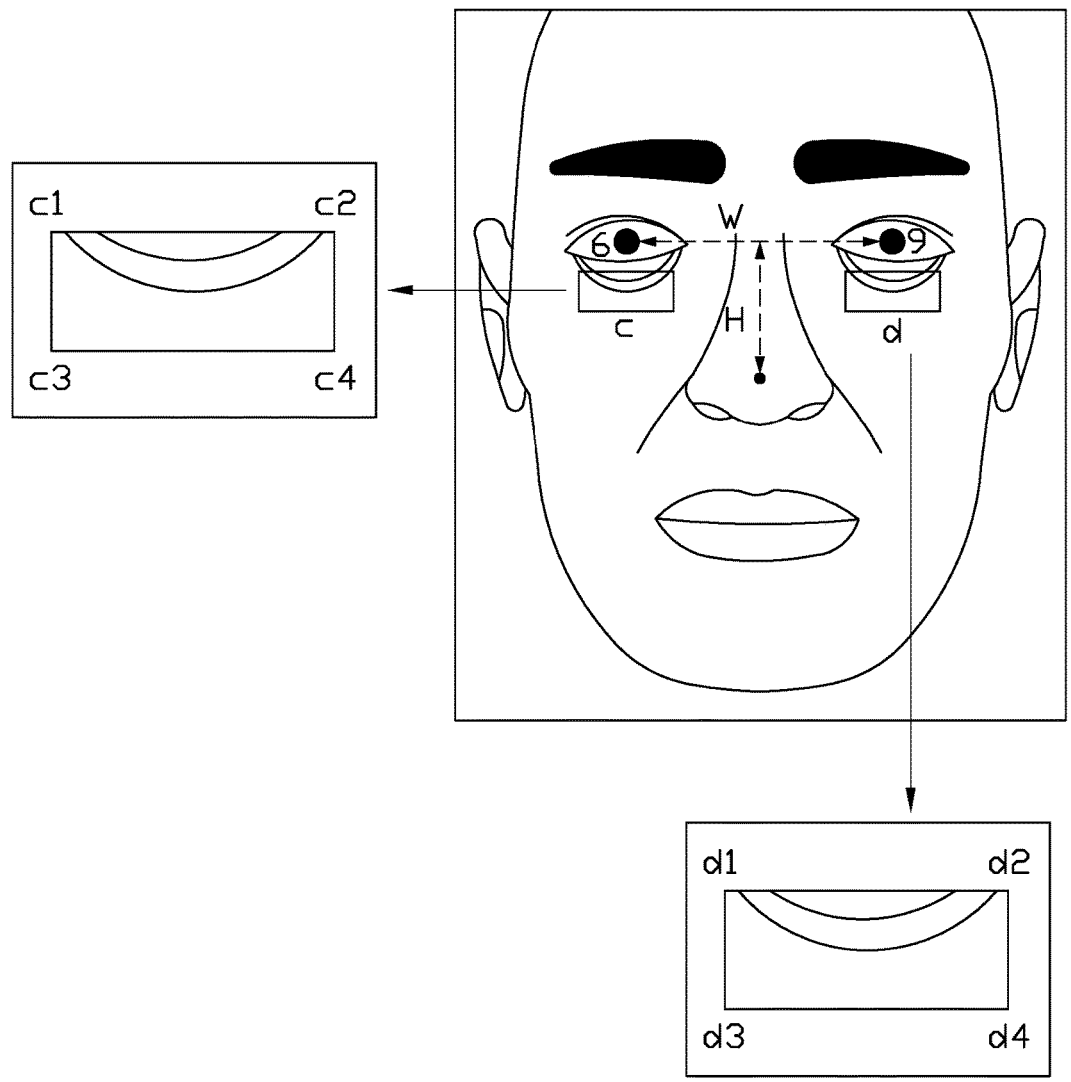
FIG. 7 is a diagrammatic view to show sizes and positions of two eye nether areas.

FIG. 7 illustrates that the left eye nether area c includes four corners c1, c2, c3, c4 and the right eye nether area d includes four corners d1, d2, d3, d4. The positions of the corners are defined in below block.

| corner | X | Y |
|---|---|---|
| c1 | X = X6 − W*0.4 | Y = (Y6 + Y9)/2 + H*0.35 |
| c2 | X = X6 + W*0.3 | Y = (Y6 + Y9)/2 + H*0.35 |
| c3 | X = X6 − W*0.4 | Y = (Y6 + Y9)/2 + H*0.8 |
| c4 | X = X6 + W*0.3 | Y = (Y6 + Y9)/2 + H*0.8 |
| d1 | X = X9 − W*0.3 | Y = (Y6 + Y9)/2 + H*0.35 |
| d2 | X = X9 + W*0.4 | Y = (Y6 + Y9)/2 + H*0.35 |
| d3 | X = X9 − W*0.3 | Y = (Y6 + Y9) + H*0.8 |
| d4 | X = X9 + W*0.4 | Y = (Y6 + Y9) + H*0.8 |

Figure 8:
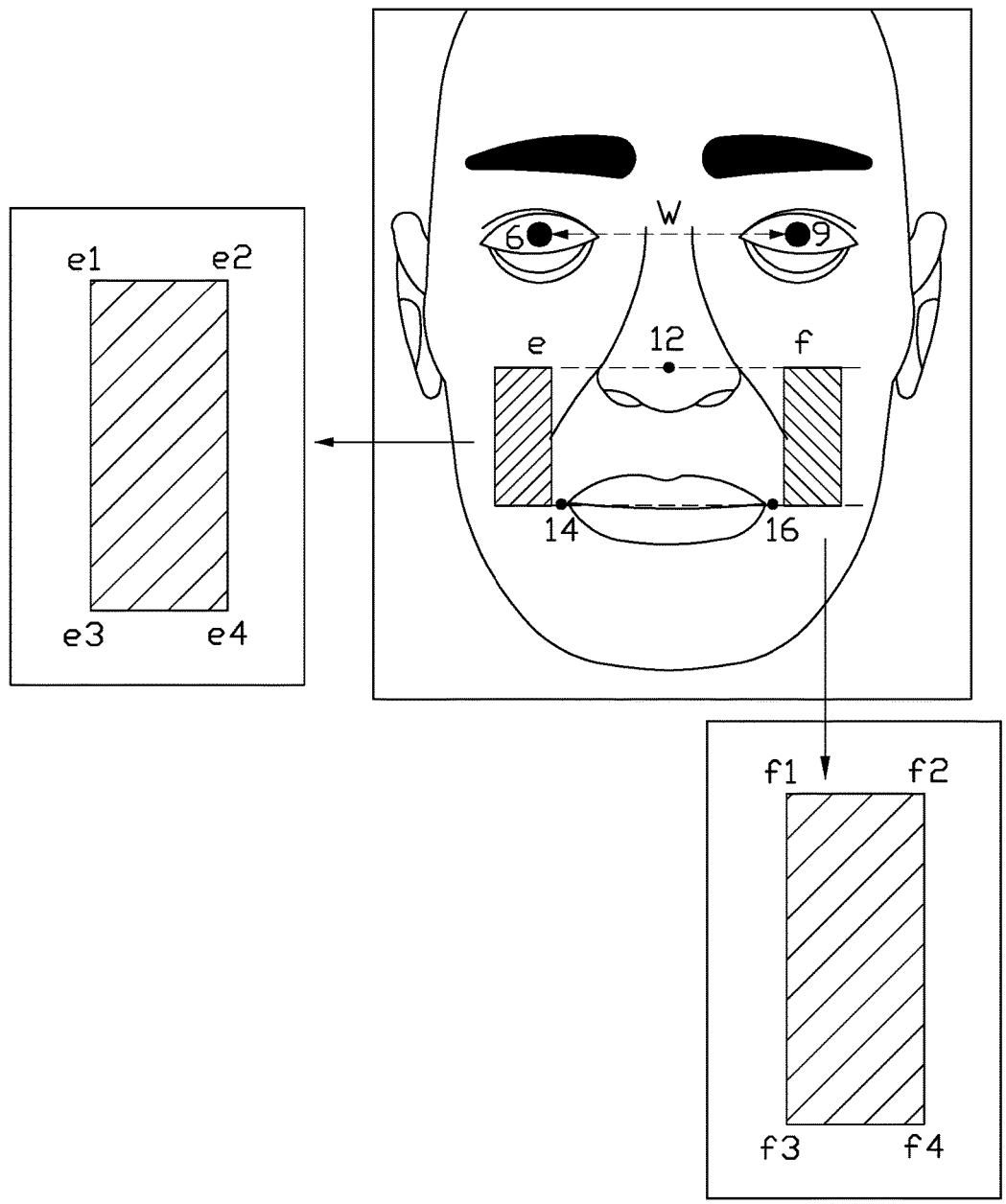
FIG. 8 is a diagrammatic view to show sizes and positions of two smile folds areas.

FIG. 8 illustrates that the left smile folds area e includes four corners e1, e2, e3, e4 and the right smile folds area f includes four corners f1, f2, f3, f4. The positions of the corners are defined in below block.

| corner | X | Y |
|---|---|---|
| e1 | X = X6 − W*0.32 | Y = Y12 |
| e2 | X = X6 − W*0.05 | Y = Y12 |
| e3 | X = X6 − W*0.32 | Y = (Y14 + Y16)/2 |
| e4 | X = X6 − W*0.05 | Y = (Y14 + Y16)/2 |
| f1 | X = X9 + W*0.05 | Y = Y12 |
| f2 | X = X9 + W*0.32 | Y = Y12 |
| f3 | X = X9 + W*0.05 | Y = (Y14 + Y16)/2 |
| f4 | X = X9 + W*0.32 | Y = (Y14 + Y16)/2 |

Therefore, positions and sizes of the age feature areas a-f are defined.

At block 105, the method includes adjusting same type age feature areas into a same size.

In the age feature areas a-f, the two eye tail areas a and b are same type age feature areas, two eye nether areas c and d are same type age feature areas, and two smile folds areas e and f are same type age feature areas. For example, the eye tail area a has a length of 9 millimeters and a height of 6 millimeters. The eye tail area b has a length of 6 millimeters and a height of 8 millimeters. The size of the eye tail area a is adjusted to shorten the length of eye tail area a to 6 millimeters, and lengthen the height of the eye tail area a to 8 millimeters. Therefore, the eye tail areas a and b have a same size.

At block 106, the method includes transferring the face area into a processed image by Modified Census Transform method.

In one embodiment, the Modified Census Transform method defines the clear image into a plurality of small areas each of which includes nine pixels aligned into three rows three columns. In each small area, an average pixel value of the nine pixels is calculated. The average pixel value is compared to the pixel value of each pixel. When pixel value of one pixel is larger than the average pixel value, the pixel value of the pixel is changed to "1". When pixel value of one pixel is not larger than the average pixel value, the pixel value of the pixel is changed to "0".

At block 107, the method includes acquiring age feature from the processed image to get an age value, and comparing the age value with a first threshold value to check whether the age value is smaller than the first threshold. If the age value is smaller than the first threshold, go to step 109. If the age value is not smaller than the first threshold, go to step 108.

At block 108, the method includes comparing the age value with a second threshold value to check whether the age value is smaller than the second threshold. If the age value is not smaller than the second threshold, go to step 111. If the age value is smaller than the second threshold, go to step 110.

At block 109, the method includes judging belonging to youth.

At block 110, the method includes judging belonging to middle age.

At block 111, the method includes judging belonging to the old.

In the above method, the age is defined by setting facial feature points to get age feature areas.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method to identify age based on facial features, comprising:
   getting a face image and capturing a face area from the face image;
   setting a plurality of facial feature points on the face area;
   defining a plurality of age feature areas on the face area based on coordinates of the plurality of feature points;
   adjusting same types of age feature areas into a same size;
   acquiring age feature from the plurality of age feature area to get an age value; and
   comparing the age value with at least one threshold value.

2. The method of claim 1, wherein the plurality of facial feature points mark eyebrow, eye, nose, and mouth of the face image.

3. The method of claim 2, wherein there are seventeen feature points to mark a left eyebrow tail, a left eyebrow head, a right eyebrow head, a right eyebrow tail, an outer canthus of a left eye, a middle portion of the left eye, an inner canthrus of the left eye, an inner canthrus of a right eye, a middle portion of the right eye, an outer canthurs of the right eye, a left nosewing, a tip of the nose, a right nosewing, a left corner of the mouth, a middle portion of a upper lip of the mouth, a right corner of the mouth, and a middle portion of a lower lip of the mouth.

4. The method of claim 3, wherein before defining the plurality of age feature areas on the face area based on coordinates of the plurality of feature points, a distance between the left eye and the right eye and a distance between the tip of the nose and a middle portion of the two eyes are calculated.

5. The method of claim 4, wherein the plurality of age feature areas includes a left eye tail area, a right eye tail area, a left eye nether area, a right eye nether area, a left smile folds area and a right smile fold area.

6. The method of claim 5, wherein the left and right eye tail areas are same type age feature areas, the left and right eye nether areas are same type age feature areas, and the left and right smile folds areas are same type age feature areas.

7. The method of claim 1, wherein the face area is processed into a processed image by Modified Census Transform method before acquiring age feature from the plurality of age feature area.

8. The method of claim 1, wherein the at least one threshold value comprises a first threshold value and a second threshold value, and the age value is compared to the second threshold value when the age value is not smaller than the first threshold value.

9. A method to identify age based on facial features, comprising:
  getting a face image and capturing a face area from the face image;
    setting a plurality of facial feature points on the face area;
    defining a plurality of age feature areas on the face area based on coordinates of the plurality of feature points;
    adjusting same types of age feature areas into a same size;
    acquiring age feature from the plurality of age feature area to get an age value;
    comparing the age value with a first threshold value and a second threshold value, and
  defining belong to youth when the age value is smaller than the first threshold value, defining belong to middle age when the age value is not smaller than the first threshold value but smaller than the second threshold value, defining belong to the old when the age value is not smaller than the second threshold value.

10. The method of claim 9, wherein the plurality of facial feature points mark eyebrow, eye, nose, and mouth of the face image.

11. The method of claim 10, wherein there are seventeen feature points to mark a left eyebrow tail, a left eyebrow head, a right eyebrow head, a right eyebrow tail, an outer canthus of a left eye, a middle portion of the left eye, an inner canthrus of the left eye, an inner canthrus of a right eye, a middle portion of the right eye, an outer canthurs of the right eye, a left nosewing, a tip of the nose, a right nosewing, a left corner of the mouth, a middle portion of a upper lip of the mouth, a right corner of the mouth, and a middle portion of a lower lip of the mouth.

12. The method of claim 11, wherein before defining the plurality of age feature areas on the face area based on coordinates of the plurality of feature points, a distance between the left eye and the right eye and a distance between the tip of the nose and a middle portion of the two eyes are calculated.

13. The method of claim 12, wherein the plurality of age feature areas includes a left eye tail area, a right eye tail area, a left eye nether area, a right eye nether area, a left smile folds area and a right smile fold area.

14. The method of claim 13, wherein the left and right eye tail areas are same type age feature areas, the left and right eye nether areas are same type age feature areas, and the left and right smile folds areas are same type age feature areas.

15. The method of claim 10, wherein the face area is processed into a processed image by Modified Census Transform method before acquiring age feature from the plurality of age feature area.

* * * * *